March 10, 1931.        A. KOMOW        1,795,781
SHARPENING DEVICE
Filed July 22, 1929     2 Sheets-Sheet 1

INVENTOR
Albert Komow
BY
Mock + Blum
ATTORNEYS

March 10, 1931.   A. KOMOW   1,795,781
SHARPENING DEVICE
Filed July 22, 1929   2 Sheets-Sheet 2

INVENTOR
Albert Komow
BY
Mock & Blum
ATTORNEYS

Patented Mar. 10, 1931

1,795,781

UNITED STATES PATENT OFFICE

ALBERT KOMOW, OF NEW YORK, N. Y., ASSIGNOR TO THE U. S. CLOTH CUTTING MACHINE CO., INC., OF NEW YORK, N. Y., A CORPORATION OF NEW YORK

SHARPENING DEVICE

Application filed July 22, 1929. Serial No. 380,175.

My invention relates to a new and improved sharpening device for cutting machines.

One of the objects of my invention is to provide a device which shall be especially suitable for cloth cutting machines having circular knives, although my invention is not to be restricted thereto.

Another object of my invention is to provide a sharpening device which can be readily and efficiently utilized without requiring frequent adjustments by a skilled operator.

Another object of my invention is to provide a sharpening device which shall automatically align itself with the edge of the cutting blade.

Other objects of my invention will be set forth in the following description and drawings which illustrate a preferred embodiment thereof, it being understood that the above general statement of the objects of my invention is intended merely to generally explain the same, and not to limit it in any manner.

Figure 6:
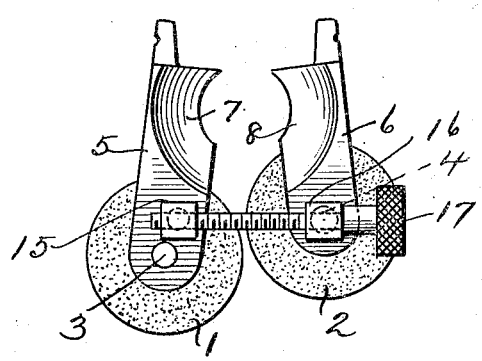
Fig. 6 is a detail front elevation showing the grinding members and the supporting arms therefor.
Figure 7:
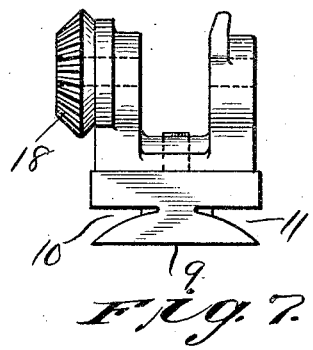
Fig. 7 is a detail top view of the bearing for the arms of the grinding members.

The invention is shown as applied to any well known type of cloth cutting machine having a circular knife K operated by a motor in the housing H. The machine is provided with a lamp L of any suitable type, and with a handle M, and a support or stand S. These parts in themselves require no explanation as they are well known. The grinding members consist of two staggered disks 1 and 2 made of any suitable material. These grinder disks 1 and 2 are mounted upon shafts 3 and 4. As shown in Fig. 6, said shafts 3 and 4 are connected to supporting arms 5 and 6. Said supporting arms 5 and 6 are provided with chamfered bearing portions 7 and 8, having the general arcuate shape shown in Fig. 6. The supporting arms 5 and 6 are turnably and releasably connected to a bearing member 9 having recesses 10 and 11 which are adapted to receive the chamfered portions 7 and 8 of the supporting arms 5 and 6. The outer ends of the supporting arms 5 and 6 can be connected by a tension spring 12.

When the parts are thus assembled, the general wedge shape of the chamfered portions 7 and 8 prevents said supporting arms 5 and 6 from being moved longitudinally, while permitting said arms 5 and 6 to turn against the tension exerted by the spring 12. The arms 5 and 6 can turn, not only separately, but also jointly. Hence, if one of the arms 5 is turned in order to bring its associated grinding wheel into proper position, the other of the supporting arms is also automatically and equally turned, to bring its respective grinding wheel against the edge of the cutting knife, so that both grinding wheels are automatically moved into proper position with respect to the knife K. The arms 5 and 6 are provided with sleeves 15 and 16, and an adjusting screw 17 is provided whose threaded shank fits into the correspondingly threaded opening of the sleeve 15, so that the distance between the arms 5 and 6 can be regulated. As the grinder wheels wear down, the screw 17 is turned to suitably adjust the space between the grinder disks. The tension spring 12 operates to hold the grinder wheels in the relative position determined by screw 17.

The bearing member 9 is of the usual forked shape and it is provided with the usual bevel gear 18.

Figure 3:
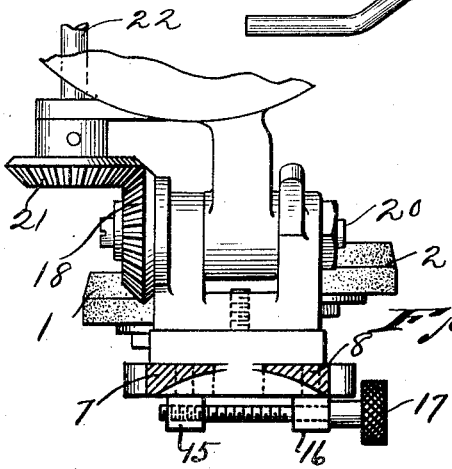
Fig. 3 is a view similar to Fig. 2 but showing the parts in the operative or vertical position.

As shown in Fig. 3 for example, the forked portion of the bearing 9 is mounted in the usual manner upon a shaft 20 connected to the frame of the machine, and the said bearing 9 is moved up and down by means of a bevel gear 21 connected to a manipulating handle 22 which is normally held in the upper position by a spring 23 or any other suitable means.

Figure 1:
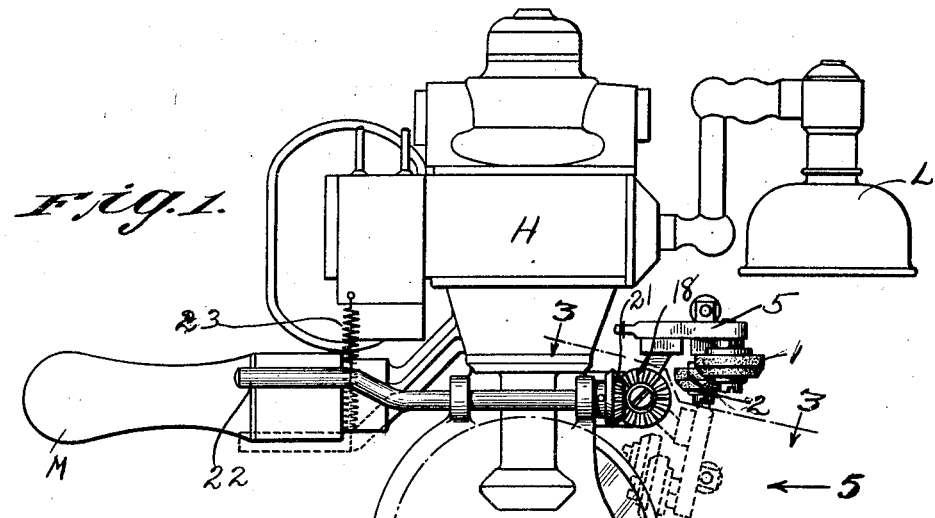
Fig. 1 is a side elevation showing the device applied to a cloth cutting machine of any suitable type.
Figure 4:
Fig. 4 is a diagrammatic view showing the staggered relationship between the grinding members and illustrating how said members become automatically aligned with the edge of the cutting blade, when said members are moved to the operative position.
Figure 4:
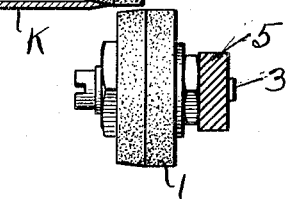
Figure 2:
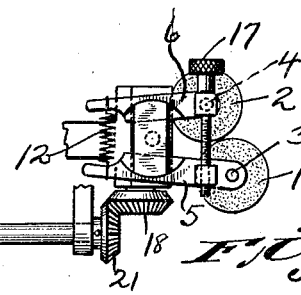
Fig. 2 is a top view of the essential parts of the grinding attachment, the parts being shown in the inoperative position.
Figure 5:
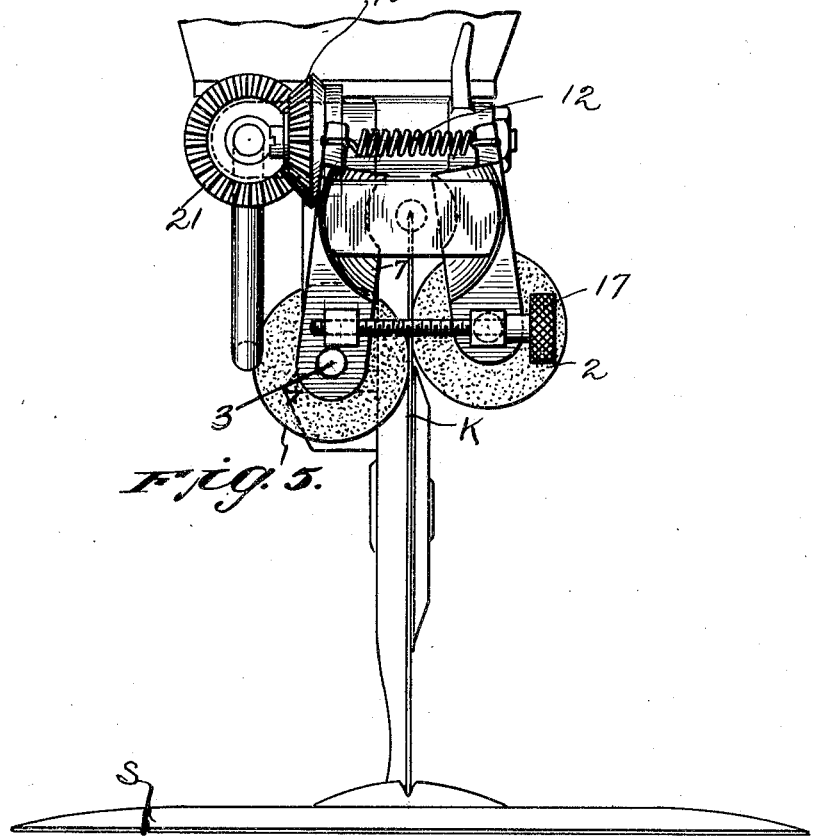
Fig. 5 is a detail front elevation showing the grinding members in operative position.

In devices of this general type heretofore used, the grinder wheels or disks were so mounted, as to make it impossible for them to have an automatic movement lateral to the cutting knife, when said grinder disks were moved to the operative position. Hence, after the grinder disks had been used a number of times, it was necessary for an expert mechanic to make the proper adjustment. However, and as shown in the instant case, the tapered cutting edge of the knife K and the corresponding tapered shape of the front portions of the grinder disks 1 and 2, together with the mount herein described, renders it possible to automatically shift the grinder disks into proper position. When the grinder disks are moved to the dotted line position shown in Fig. 1, which is their operative position, the advance grinder disk 2 first contacts with the bevelled cutting edge as shown in Fig. 4. Its associated arm is thereupon turned to the proper angle, which automatically moves the other arm 5 to the proper angle, because both arms 5 and 6 are caused to turn in unison by their spring connection 12. Hence, when the grinder disks 1 and 2 are further moved inwardly until they both contact with the edge of the knife K, they are in proper position. As the grinder disks 1 and 2 wear down, the necessary adjustment can be made by any average operator, by manipulating the screw 17. It will be noted that each of the grinder-disk arms is yieldingly mounted, so that it can move laterally with respect to plane of the knife. In prior art devices, such lateral movement could only be secured by operating adjusting means. The yielding mount, or turnable connection between the arms 5 and 6 in the frame of the device, is provided for by the bearing portions 7 and 8. The spring 12 permits said arms to turn, while the disks are in the operative position shown in Fig. 5, and while they are in the inoperative position indicated in full lines in Fig. 1. The spring 12 cooperates with said chamfered portions 7 and 8 to yieldingly hold the grinder disks against the knife while said grinder disks are in the operative position, and said spring 12 permits the grinder disks to turn freely while said disks are being moved into the operative position.

While I have shown a preferred embodiment of my invention, it is clear that numerous changes and omissions could be made without departing from its spirit.

I claim:

1. A sharpening device for a cutting machine having a frame and a movable knife, comprising a pair of sharpening members for said knife, and supporting arms for said sharpening members turnably connected to said frame, so that said supporting arms can turn in a direction lateral to said knife, and connecting means intermediate said supporting arms so that they turn in unison.

2. A sharpening device for a cutting machine having a frame and a movable knife, comprising a pair of sharpening members for said knife, and supporting arms for said sharpening members turnably connected to said frame, so that said supporting arms can turn in a direction lateral to said knife, and connecting means intermediate said supporting arms so that they turn in unison, said connecting means comprising a tension spring connected to the inner ends of said arms.

3. In a cutting machine having a frame and a movable knife, the combination of a bearing mounted on said frame and movable towards and away from said knife, said bearing having a tapered recess which is lateral with respect to said knife, an arm having a tapered portion corresponding in shape to said recess and located therein, and a grinder member connected to said arm, the tapered portion of the arm having its outer edge of a general arcuate shape, said edge being turnable in said recess so that said arm can be turned in said recess in a direction lateral to said knife.

4. In a cutting machine having a frame and a movable knife, a bearing pivotally connected to said frame and movable towards and away from said knife in a direction parallel to the plane thereof, said bearing having a pair of laterally disposed recesses therein of tapered shape, a pair of grinder members, supporting arms for said grinder members, said supporting arms having tapered portions adapted to fit into said tapered recesses, and a tension spring connected to the inner ends of said arms, the tapered portions of said arms being shaped to permit a turning movement of said arms in a direction lateral to the plane of the knife.

5. In a cutting machine having a frame and a movable knife, a bearing pivotally connected to said frame and movable towards and away from said knife in a direction parallel to the plane thereof, said bearing having a pair of laterally disposed recesses therein of tapered shape, a pair of grinder members, supporting arms for said grinder members, said supporting arms having tapered portions adapted to fit into said tapered recesses, and a tension spring connected to the inner ends of said arms, the tapered portions of said arms being shaped to permit a turning movement of said arms in a direction lateral to the plane of the knife, said grinder members having their grinding surfaces in staggered relation.

In testimony whereof I affix my signature.

ALBERT KOMOW